(No Model.)
A. W. HITCHCOCK.
LAND MARKER.
No. 295,761. Patented Mar. 25, 1884.
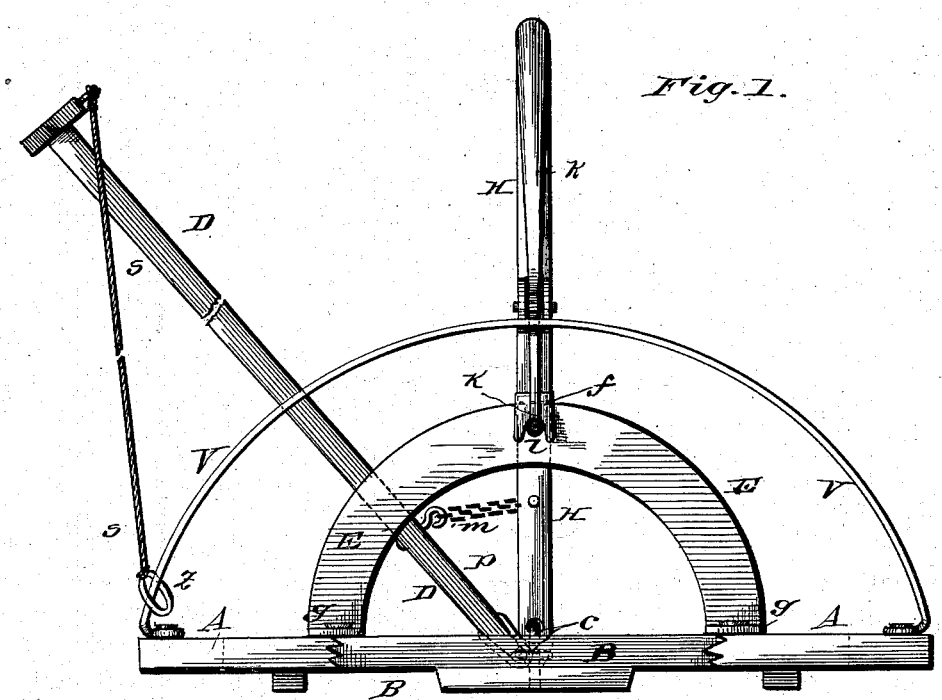
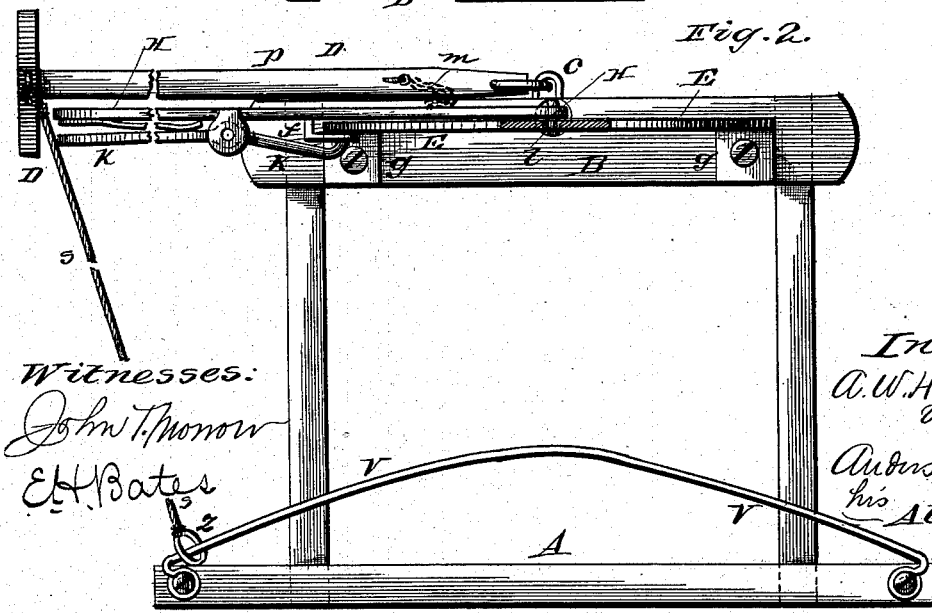
Witnesses:
John T. Monow
E. H. Bates
Inventor.
A. W. Hitchcock
by
Anderson & Smith
his Attorneys.

UNITED STATES PATENT OFFICE.

ARTHUR W. HITCHCOCK, OF PARKERSBURG, IOWA.

LAND-MARKER.

SPECIFICATION forming part of Letters Patent No. 295,761, dated March 25, 1884.

Application filed June 30, 1883. (No model.)

*To all whom it may concern:*

Be it known that I, A. W. HITCHCOCK, a citizen of the United States, residing at Parkersburg, in the county of Butler and State of Iowa, have invented certain new and useful Improvements in Gage-Lifting Devices for Corn-Planters; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a side view of my device, and Fig. 2 is a top view of the same.

This invention has relation to gage-lifting devices for corn-planters; and it consists in the construction and novel arrangement of parts, all as hereinafter set forth, and pointed out in the appended claim.

In the accompanying drawings, the letter A designates a cross-bar of the planter-frame, and B a cross-bar in rear thereof, to which is connected by a loose hinge or link joint, $c$, the gage D. Rising from the bar B is the transverse arch E, which is secured by its feet $g$ to said bar. Centrally pivoted to said bar under the arch is the lifting-lever H, which is provided at its handle portion with a spring-catch, $k$, adapted to engage a perforation, $l$, of the arch when the lever is in upright position. The lever is provided with a flange, $f$, which engages the upper edge of the arch, serving to hold the lever and arch in proper relative position. A short chain, $m$, connects the shank $p$ of the gage to the lever H at a distance from its pivoted end sufficient to allow the gage to fall to the ground when the lever is turned down at either end of the arch, and to raise the lever from the ground upward when said lever is turned upright.

To the front bar, A, is secured by its ends an arched runner-bearing, V, of greater span than the lever-arch E, said arched bearing extending to the sides of the planter-frame. This bearing may be made of stout wire, and upon it is a runner or traveler-ring, $z$, from which the rope, cord, or chain $s$ extends to the gage-head.

It is apparent that the gage may be revolved over from one side of the machine to the other with facility, and without disconnecting the drag rope or chain $s$, the latter passing by its runner upon the bearing V to the opposite side of the machine at the same time.

I am aware that it is not new to combine, with a pivoted gage-arm, a pivoted lever for operating the same in connection with an arch, and that land-markers have been provided with a pivoted gage and a drag rope or chain having a traveling ring and an arched runner-bearing therefor, the outer end of the gage-arm or marker having a rope which connects with the driver's seat, and therefore I do not claim such constructions, broadly.

Having described this invention, what I claim, and desire to secure by Letters Patent, is—

The combination, with the gage-bar D, connected by a link-joint, $c$, to the bar B, to be moved freely in any direction, and connected to the arched runner-bar V by a rope, $s$, of the operating-lever H, having the spring-catch $k$, and a flexible connection with the gage-bar D and a sliding connection with the arch E, whereby the movement of the gage D, when in contact with the ground, is independent of the lever H, substantially as specified.

In testimony whereof I affix my signature in presence of two witnesses.

ARTHUR W. HITCHCOCK.

Witnesses:
J. T. FRAIM,
M. CARTNER.